United States Patent [19]

Torimitsu

[11] Patent Number: 5,586,446
[45] Date of Patent: Dec. 24, 1996

[54] MONITORING SYSTEM FOR ICE MAKING MACHINE

[75] Inventor: Hiroshi Torimitsu, Nagoya, Japan

[73] Assignee: Hoshizaki Denki Kabushiki Kaisha, Toyoake, Japan

[21] Appl. No.: 541,719

[22] Filed: Oct. 10, 1995

Related U.S. Application Data

[63] Continuation of Ser. No. 152,501, Nov. 16, 1993, abandoned.

[51] Int. Cl.$^6$ .................................................. F25B 49/02
[52] U.S. Cl. .......................... 62/126; 62/127; 340/825.06
[58] Field of Search ............................. 62/125, 126, 127, 62/129, 130, 137, 138, 175; 165/11 R, 22; 236/51, 94; 340/825.06, 825.07, 825.08, 825.16, 825.17, 825.22, 825.36, 825.37

[56] References Cited

U.S. PATENT DOCUMENTS

| | | | |
|---|---|---|---|
| 4,090,248 | 5/1978 | Swanson et al. | 340/825.06 X |
| 4,426,851 | 1/1984 | Neumann | 62/127 X |
| 4,441,329 | 4/1984 | Dawley | 62/127 X |
| 4,555,057 | 11/1985 | Foster | 236/94 |
| 4,788,647 | 11/1988 | McManus et al. | 340/825.06 X |
| 4,811,897 | 3/1989 | Kobayashi et al. | 340/825.07 X |
| 5,279,458 | 1/1994 | DeWolf et al. | 165/22 X |

*Primary Examiner*—Harry B. Tanner
*Attorney, Agent, or Firm*—Nikaido, Marmelstein, Murray & Oram LLP

[57] ABSTRACT

A monitoring system for a plurality of ice making machines each of which includes an ice making mechanism, a detection device for detecting operating condition of the ice making mechanism and a control device for electrically controlling the ice making mechanism in accordance with the detected operating condition, wherein the ice making machines each are provided with an output circuit for issuing an electric signal indicative of the detected operating condition outwardly, and wherein the monitoring system includes a signal receiver for monitoring operation of the respective ice making machines based on the electric signals applied from the output circuits.

6 Claims, 5 Drawing Sheets

| SC | ID | DRIVE CONDITION DATA | OPERATING CONDITION DATA | CONTROL SIGNAL DATA | EC |

MONITORING SYSTEM FOR ICE MAKING MACHINE

This application is a continuation of application Ser. No. 08/152,501 filed Nov. 16, 1993, abandoned.

BACKGROUND OF THE INVENTION

1. Field of the Invention

The present invention relates to a monitoring system for remotely monitoring operating condition of ice making machines.

2. Description of the Prior Art

For inspecting abnormality in operation of a number of ice making machines installed in a hotel, a big store, an office building or the like, the ice making machines must be inspected one by one, resulting in trouble for the user and an error in finding abnormality of the respective ice making machines.

SUMMARY OF THE INVENTION

It is, therefore, a primary object of the present invention to provide a monitoring system for ice making machines capable of remotely monitoring each operating condition of the ice making machines without any error in finding abnormality of the respective ice making machines.

According to the present invention, the object is accomplished by providing a monitoring system for a plurality of ice making machines each of which includes an ice making mechanism, a detection device for detecting operating condition of the ice making mechanism and control means for electrically controlling the ice making mechanism in accordance with the detected operating condition, wherein the ice making machines each are provided with output means for issuing an electric signal indicative of the detected operating condition outwardly, and wherein the monitoring system comprises a signal receiver for monitoring operation of the respective ice making machines based on the electric signals applied thereto from the respective output means.

With the monitoring system, the operating condition of all the ice making machines can be monitored by an operator under observation of the signal receiver to avoid trouble caused by abnormality in operation of the respective ice making machines.

In a practical embodiment of the present invention, it is preferable that the signal receiver is comprised of a microcomputer backed up by a battery. With such an arrangement, the monitor of the ice making machines can be conducted even if the power supply is suspended at the installation place of the signal receiver. It is also preferable that a plurality of the signal receivers each are connected to an administrative computer to be administrated by the administrative computer. With this arrangement, operating condition of plural ice making machines and each condition of the signal receivers can be monitored by an operator under observation of the administrative computer.

It is further preferable that the signal receivers each are comprised of a microcomputer arranged to be applied with a control program from the administrative computer. In this case, even if the ice making machines connected to the signal receivers are replaced with other ice making machines, each function of the signal receivers can be adjusted in accordance with the replaced ice making machines by an instruction from the administrative computer. Thus, the signal receivers can be utilized in common without replacement of their components and adjustment thereof.

Furthermore, the signal receivers may be provided with signal transmit-receive means for receiving the electric signals from the ice making machines through a telephone line and for transmitting the electric signals to an external device therefrom through the telephone line. In this case, it is able to collectively administrate a number of ice making machines.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

First Embodiment

Figure 1:
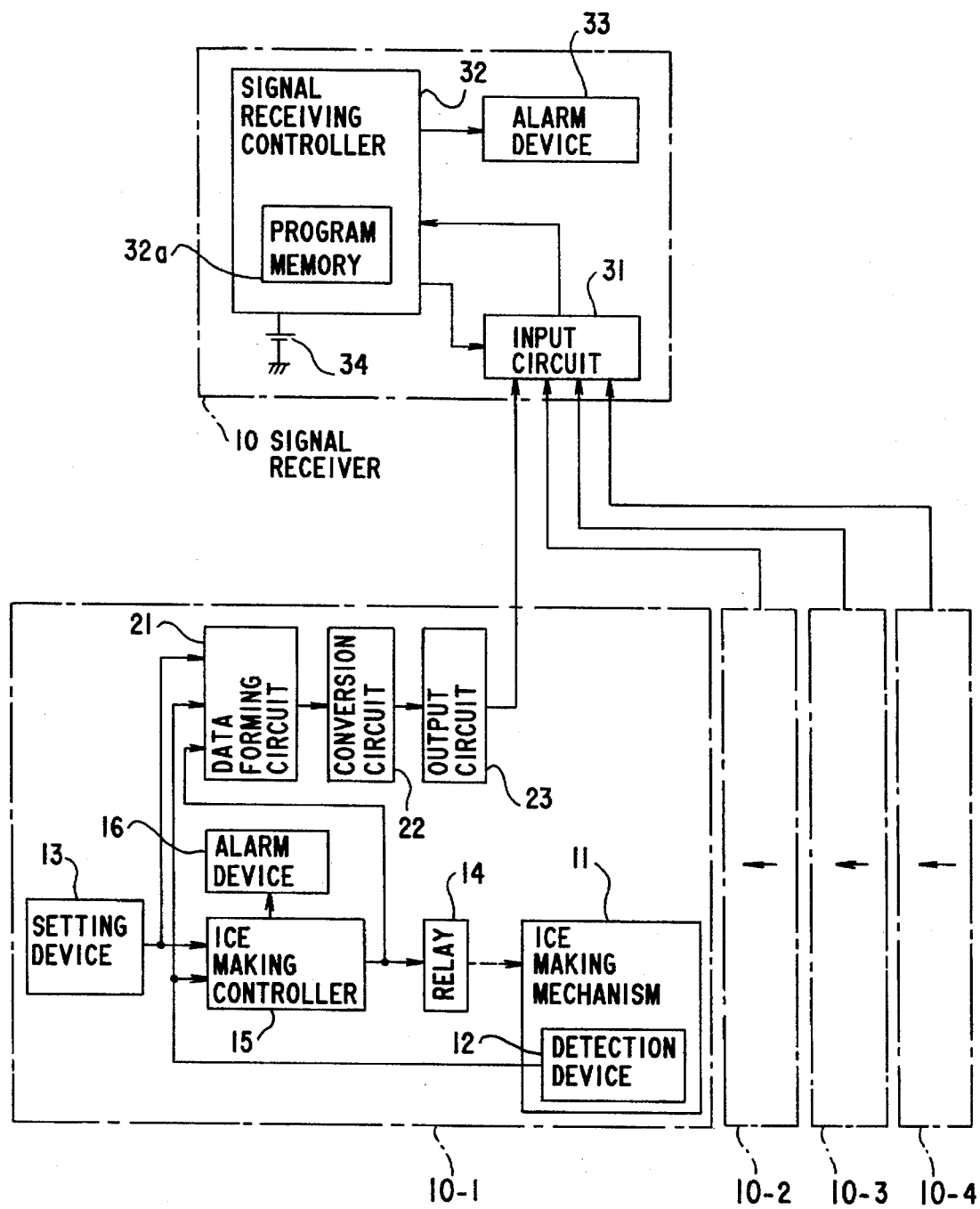
FIG. 1 is a block diagram of a first embodiment of a monitoring system for ice making machines in accordance with the present invention.

Hereinafter, a first embodiment of the present invention will be described with reference to the drawings. In FIG. 1 there is illustrated a monitoring system for ice making machines according to the first embodiment. The monitoring system includes a signal receiver 10 connected to four sets of ice making machines 10-1 to 10-4 which are installed in respective rooms of a hotel or an office building or plural places in a big store. The signal receiver 10 is installed in an administrative room of the hotel, the office building or the store.

The ice making machines 10-1 to 10-4 each includes an ice making mechanism 11, a detection device 12 for detecting operating condition of the ice making mechanism 11, a setting device 13 for setting a drive condition of the ice making mechanism 11, an ice making controller 15 connected to the ice making mechanism 11 through a group of relay circuits 14 for controlling operation of the ice making mechanism 11 in accordance with the operating condition detected by the detection device 12 and the drive condition determined by the setting device 13, and an alarm device 16 for informing an operator of an occurrence of abnormality in operation of the ice making mechanism 11. The ice making machines 10-1 to 10-4 each are well known as a batch type ice making machine such as a vertical-flow type ice making machine, a cell type ice making machine or a plate type ice making machine or as a continuous ice making machine such as a auger type ice making machine.

Figures 2, 3:
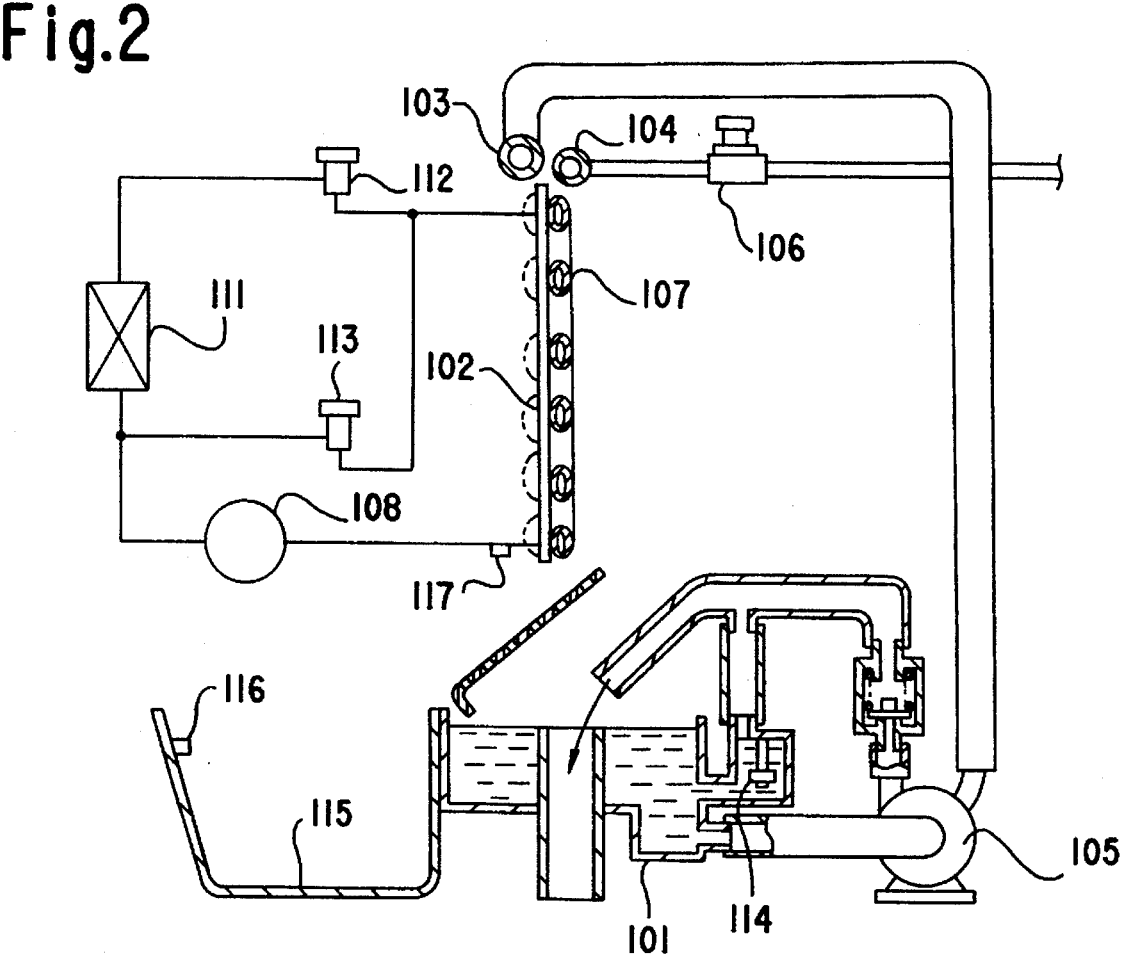
FIG. 2 is a schematic illustration of an ice making mechanism shown in FIG. 1.
FIG. 3 is a format of data transmitted to a signal receiver from the respective ice making machines shown in FIG. 1.

In the case that the ice making machines 10-1 to 10-4 each are in the form of a vertical-flow type ice making machine as shown in FIG. 2, the ice making mechanism 11 has an upright ice making plate 102 arranged above a water tank 101 and watering pipes 103, 104 located above the ice making plate 102. The watering pipe 103 is supplied with fresh water from the water tank 101 in operation of a circulation pump 105, while the watering pipe 104 is supplied with service water through a water valve 106. The ice making plate 102 is provided at its rear surface with an evaporator coil 107 which is disposed in a refrigeration circuit including an electric compressor 108, a condenser 111 and an expansion valve 112. At an ice making cycle of operation, the refrigeration circuit acts to cool the ice making plate 102 from its rear surface. The compressor 108 is connected to an upstream of evaporator coil 107 through a hot gas valve 113 to warm up the ice making plate 102 at a defrost cycle of operation.

The detection device 12 includes a float switch 114 arranged to detect an amount of water in the water tank 101, an ice sensor 116 arranged within an ice storage bin 115 to detect an amount of ice stored therein and a temperature sensor 117 arranged to detect a temperature at an outlet side of evaporator coil 107. The setting device 13 is in the form of a rotary volume switch or a numeral ten-key switch which is adapted to determine each time period for the ice making cycle of operation and the defrost cycle of operation. The ice making controller 15 is in the form of a microcomputer which is programmed to control the ice making cycle of operation and the defrost cycle of operation of the ice making mechanism 11 on a basis of the operating condition detected by the detection device 12 and the drive condition determined by the setting device 13. For control of the cycle of operation, the group of relay circuits 14 are turned on or off in response to a control signal applied from the ice making controller 15 to control each operation of the circulation pump 105, water valve 106, electric compressor 108 and the hot gas valve 113 thereby to automatically produce ice pieces.

Additionally, the ice making controller 15 is designed to detect abnormality in operation of the ice making mechanism 11 on a basis of input signals applied thereto. The alarm device 16 is in the form of an alarm lamp or buzzer arranged to inform the operator of the detected abnormality.

In the batch type ice making machine such as the cell type ice making machine or the plate type ice making machine, the ice making process will be conducted by repeat of the ice making cycle of operation and the defrost cycle of operation substantially in the same manner as described above. In the continuous ice making machine such as the auger type ice making machine, the detection device 12 is arranged to cooperate with the ice sensor 16 for integrating the operation time of the ice making mechanism. In the auger type ice making machine, the auger is gradually defaced by use of the ice making machine for a long period of time. Accordingly, the integrated operation time is utilized to inform the operator of a timing for replacement of the auger. In the auger type ice making machine, the setting device 13 is utilized to determine a time interval for supply of the water, and the ice making controller 15 is adapted to control the electric compressor and water valve in the ice making mechanism in response to input signals applied from the detection device 12 and setting device 13.

The ice making machines 10-1 to 10-4 each are provided with an external interface composed of a data forming circuit 21, a parallel-serial conversion circuit 22 and an output circuit 23. The data forming circuit 21 is connected to the detection device 12, setting device 13 and ice making controller 15 to primarily memorize input signals respectively indicative of the drive and operating conditions of the ice making mechanism 11 and a control signal applied from the controller 15. The data forming circuit 21 is designed to add the input data to a start code SC, an identity data ID and an end code ED for forming a set of data and applying it to the parallel-serial conversion circuit 22. The parallel-serial conversion circuit 22 is designed to convert the set of data in parallel-serial, and the output circuit 23 is arranged to apply the set of converted data to the signal receiver 10 in a serial format.

In FIG. 3 there is illustrated the serial format of the set of converted data, wherein the start code SC represents a leading position of the set of converted data, the identity data ID represents an indentity number for identifying each model name or type of the ice making machines 10-1 to 10-4, the drive condition data represents a drive condition determined by the setting device 13, the operating condition data represents operating condition detected by the detection device 12, the control signal data corresponds with a control signal applied from the ice making controller 15, and the end code EC represents a trailing end of the set of converted data.

The signal receiver 10 is comprised of a microcompuer which includes an input circuit 31, a signal receiving controller 32 and an alarm device 33. The signal receiving controller 32 is connected to a battery 34 to back up the signal receiver 10 for activation thereof in an occurrence of suspension of the electric power. The input circuit 31 is applied with four sets of serial data from the ice making machines 10-1 to 10-4 under control of the signal receiving controller 32 and to convert the four sets of serial data respectively into parallel data for supplying the converted parallel data to the signal receiving controller 32. The signal receiving controller 32 is provided with a program memory 32a which memorizes a program for monitoring operating condition of the respective ice making machines 10-1 to 10-4 and for detecting abnormality in operation of the respective ice making machines 10-1 to 10-4. The alarm device 33 is provided with an indicator for the respective ice making machines 10-1 to 10-4 and a common buzzer for all the ice making machines, wherein the indicator and buzzer are controlled by the signal receiving controller 32 to inform the operator of abnormality in operation of the respective ice making machines.

In operation of the signal receiver 10, the signal receiving controller 32 executes the memorized program to read out the four sets of converted parallel data respectively defined by the start code SC and end code EC through the input circuit 31. Based on the four sets of converted parallel data, the signal receiving controller 32 detects abnormality in operation of the respective ice making machines 10-1 to 10-4 under the following condition and activates the alarm device 33 to inform the operator of the ice making machine operated in an abnormal condition.

1) To determine the ice making machine as being operated in an abnormal condition if the drive and operating condition data of the ice making machine identified by the identity data ID become abnormal.

2) To determine the ice making machine as being operated in an abnormal condition if the control data of the ice making machine identified by the identity data ID becomes abnormal.

3) To determine the ice making machine as being operated in an abnormal condition if a resultant of relative comparison of the drive and operating condition data with the control data of the ice making machine identified by the identity data ID becomes abnormal.

As described above, the signal receiving controller 32 is activated to monitor operating condition of the respective ice making machines 10-1 to 10-4 for detecting an occurrence of abnormality in operation thereof. In the occurrence of abnormality, the alarm device 33 is activated to inform the operator of the ice making machine identified by the identity data ID. Thus, the operating condition of all the ice making machines 10-1 to 10-4 can be monitored by an operator under observation of the alarm device 33 to avoid trouble caused by abnormality in operation of the respective ice making machines. Since the signal receiver 10 is backed up by the battery 34, the monitor of the ice making machines can be conducted even if the power supply is suspended at the installation place of the signal receiver 10.

Second Embodiment

Figure 4:
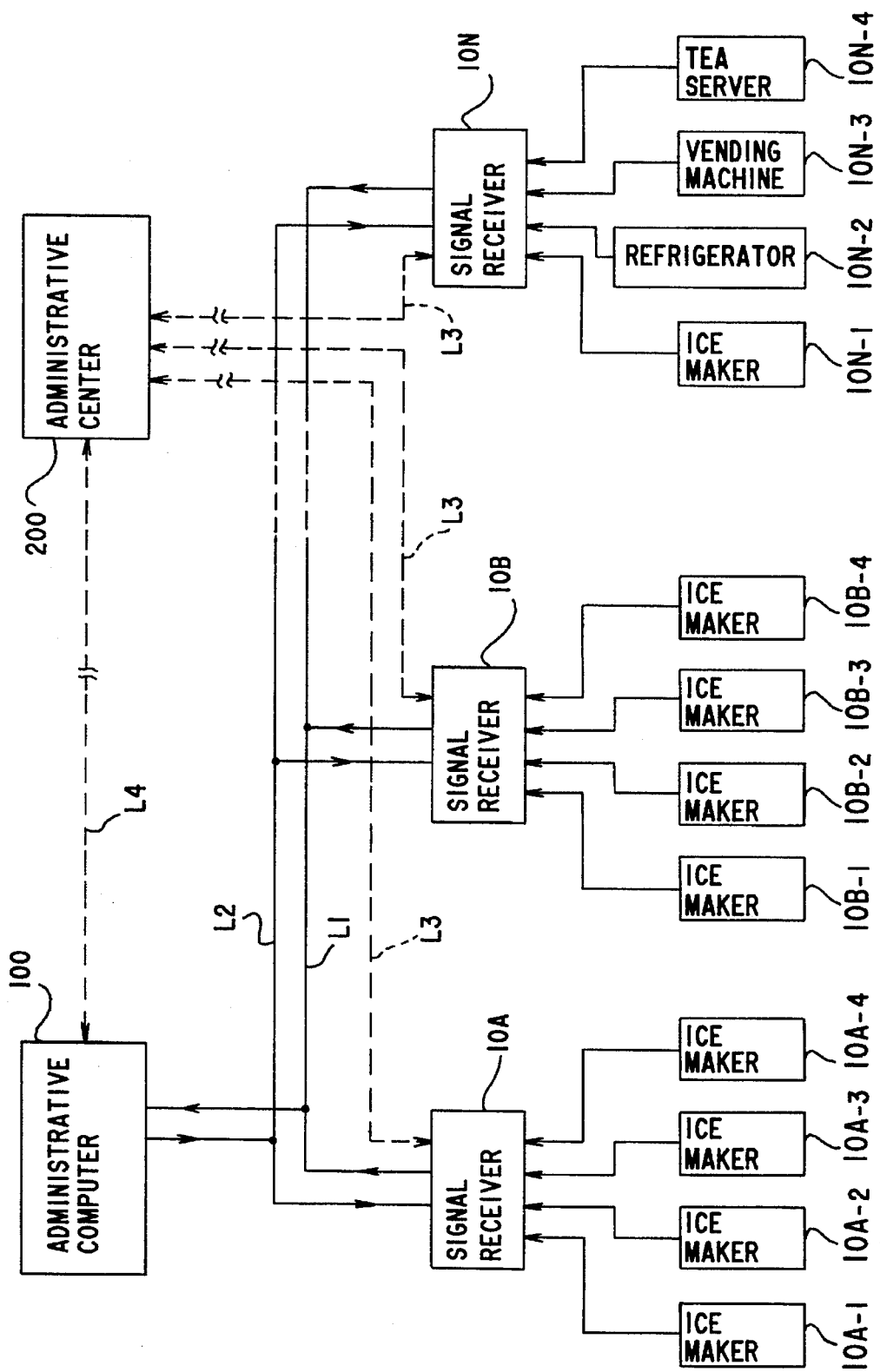
FIG. 4 is a block diagram of a second embodiment of a monitoring system for ice making machines in accordance with the present invention.
Figure 5:
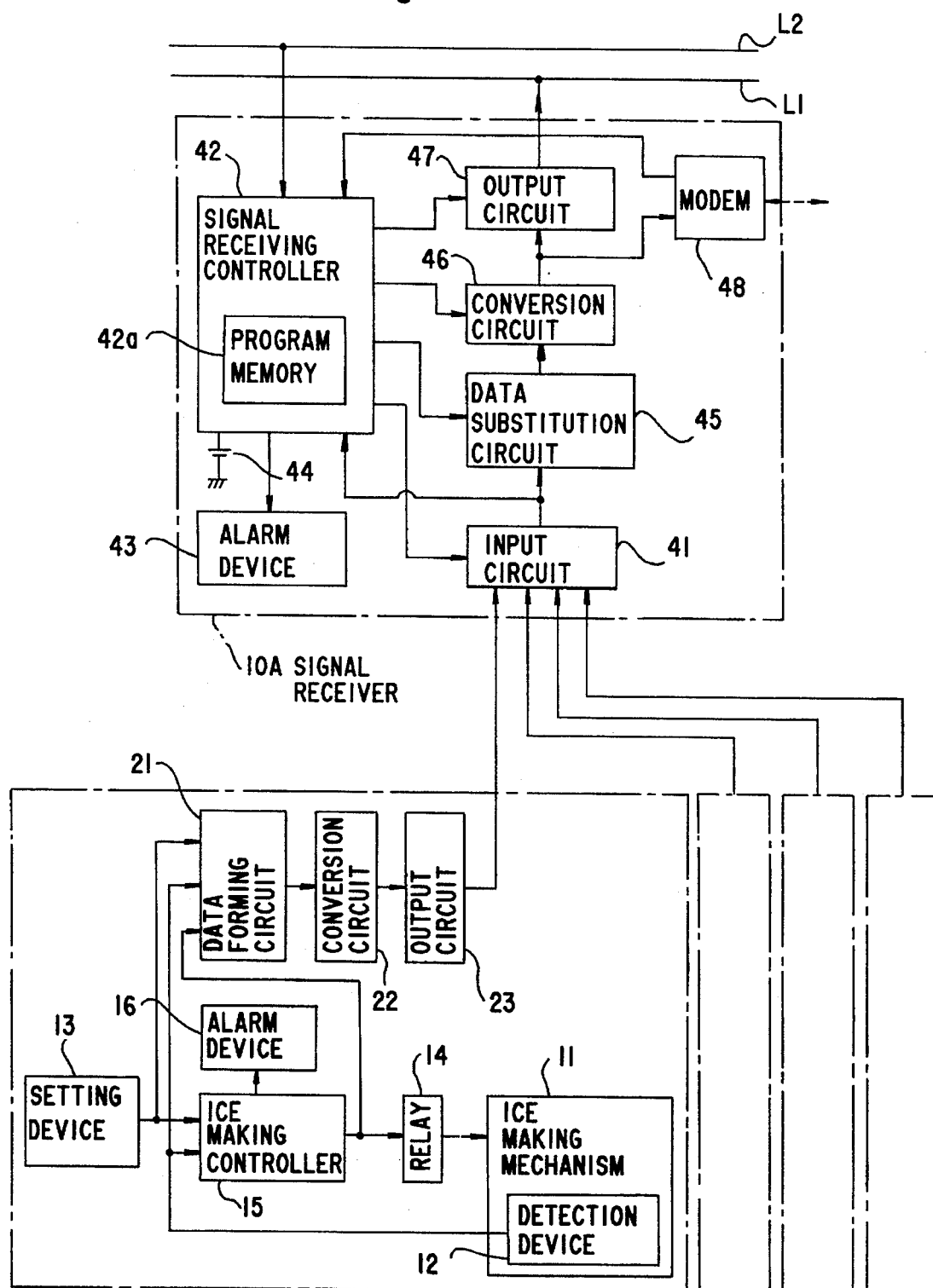
FIG. 5 is a detailed block diagram of one of signal receivers and ice making machines shown in FIG. 4.

In FIG. 4 there is illustrated a second embodiment of a monitoring system for ice making machines according to the present invention, which monitoring system is constructed larger in scale than that of the first embodiment. The monitoring system of the second embodiment is provided with a plurality of signal receivers 10A, 10B ... 10N each in the form of a microcomputer. The signal receivers 10A, 10B are respectively connected to a first group of ice making machines 10A-1 to 10A-4 and to a second group of ice making machines 10B-1 to 10B-4. The ice making machines 10A-1 to 10A-4 and 10B-1 to 10B-4 are designed substantially the same in construction as those in the first embodiment as shown in FIG. 5. The signal receiver 10N is connected to an ice making machine 10N-1, a refrigerator 10N-2, a vending machine 10N-3 and a tea server 10N-4 to monitor the respective machines 10N-1 to 10N-4 based on input signal data applied therefrom.

As shown in FIGS. 4 and 5, the signal receivers 10A to 10N each include an input circuit 41, a signal receiving controller 42, an alarm device 43 and a battery 44 which are substantially the same in construction and function as those in the first embodiment. The signal receivers 10A to 10N each are provided with a data substitution circuit 45, a parallel-serial conversion circuit 46 and an output circuit 47 which are controlled by the signal receiving controller 42 to issue input data applied from the respective ice making machines outwardly.

Figure 6:
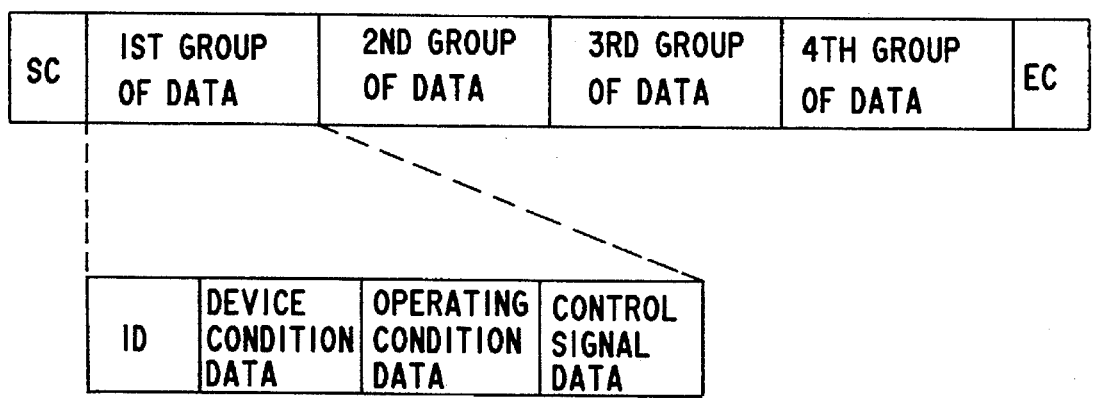
FIG. 6 is a format of data transmitted to an administrative computer from the respective signal receivers shown in FIG. 4.

The data substitution circuit 45 is designed to substitute the four sets of data converted in parallel at the input circuit 41 for a set of data and to apply the substituted set of data to the parallel-serial conversion circuit 46. In substitution of the four sets of data, as shown in FIG. 6, the respective sets of converted parallel data except for the start code and end code thereof are aligned and allotted with the start code SC and end code EC at their leading and trailing ends. The parallel-serial conversion circuit 46 is arranged to convert the substituted set of data into a serial data and to apply the converted serial data to the output circuit 47.

The respective output circuits 47 of the signal receivers 10A, 10B, ... 10N are connected to an administrative computer 100 through a signal line $L_1$ to supply the converted serial data from the parallel-serial conversion circuit 46 thereto. The administrative computer 100 is substantially the same in construction and function as the signal receivers 10A, 10B ... 10N but larger in scale than the signal receivers. The administrativ computer 100 is also connected to the respective signal receiving controllers 42 of signal receivers 10A, 10B, ... 10N through a signal line $L_2$ to supply a control signal therefrom to the respective signal receiving controllers 42. Assuming that one of the signal receivers 10A, 10B, ... 10N has been designated by the administrative computer 100, the signal receiving controller 42 of the designated signal receiver is activated to apply input data from the corresponding ice making machine to the administrative computer 100 through the output circuit 47 for monitoring the ice making machine. If there occurs abnormality in operation of either one of the designated ice making machines, the administrative computer 100 acts to indicate the abnormality on an appropriate display device substantially in the same manner as in the signal receiver of the first embodiment. Thus, operation of all the ice making machines can be monitored at one place.

In the second embodiment, the program memory 42a of the respective signal receiving controllers 42 is in the form of a random access memory or RAM which is arranged to store a control program applied from the administrative computer 100. In this case, the administrative computer 100 identifies the respective model names or types of the ice making machines based on the identity data ID of the data supplied from the signal receivers 10A, 10B ... 10N and causes the program memory 42a to store each control program suitable for the ice making machines through the signal line $L_2$. Accordingly, even if the ice making machines connected to the signal receivers 10A, 10B ... 10N were replaced with other ice making machines of different models or types, each function of the signal receivers 10A, 10B, ... 10N could be adjusted in accordance with the replaced ice making machines by storing the control programs in the program memory 42a. Thus, the signal receivers 10A, 10B, ... 10N can be utilized in common without replacement of their components.

As shown in FIG. 5, the signal receivers 10A, 10B, ... 10N each are further provided with a modem 48 which is arranged to connect the signal receivers 10A, 10B ... 10N to an external device such as an administrative computer in an administrative center 200 by way of telephone wires $L_3$. In addition, the administrative computer in the administrative center 200 is substantially the same in function as the administrative computer 100 but larger in scale. The modem 48 of the respective signal receivers 10A, 10B, ... 10N is connected to the parallel-serial conversion circuit 46 and the signal receiving controller 42 so that the administrative computer in the administrative center 200 is applied with input data (see FIG. 6) from the signal receivers 10A, 10B ... 10N to monitor operating condition of the ice making machines. Additionally, the administrative computer in the administrative center 200 may be arranged to store the control programs in the respective program memories 42a of signal receiving controllers 42 through the modem 48. In such an arrangement, the signal receivers 10A, 10B ... 10N can be remotely controlled at the administrative center 200 to monitor and administrate the ice making machines.

In the second embodiment, the administrative computer 100 is also connected to the administrative computer in the administrative center 200 by way of a telephone wire $L_4$ so that the administrative computer 100 can be monitored and administrated at the administrative center 200.

What is claimed is:

1. A monitoring system for a plurality of ice making machines each of which includes an ice making mechanism, a detection device for detecting operating condition of the ice making mechanism and control means for electrically controlling operation of the ice making mechanism in accordance with the detected operating condition, wherein the ice making machines each are provided with output means for issuing electric signals respectively indicative of the detected operating condition and an identity number for identifying each type of the ice making machines outwardly, and wherein the monitoring system comprises a signal receiver for monitoring each operation of the ice making machines on a basis of the electric signals applied thereto from said output means, said signal receiver including means responsive to the electric signals for determining each of the ice making machines as being operated in an abnormal condition if the detected operating condition becomes abnormal in comparison with a control data for the ice making machine identified by the identity number and alarm means for informing an operator of the abnormality in operation of the ice making machine identified by the identity number.

2. A monitoring system as set forth in claim 1, wherein said signal receiver is comprised of a microcomputer backed up by a battery.

3. A monitoring system as set forth in claim 1, wherein a plurality of said signal receivers each are connected to an administrative computer to be administrated by the administrative computer.

4. A monitoring system as set forth in claim 3, wherein said signal receivers each are comprised of a microcomputer arranged to be applied with a control program from said administrative computer.

5. A monitoring system as set forth in claim 1, wherein said signal receiver is provided with signal transmit-receive means for receiving the electric signal from said ice making machine through a telephone line and for transmitting the received signal to an external device therefrom through the telephone line.

6. A monitoring system as set forth in claim 5, wherein said signal receiver is comprised of a microcomputer arranged to be applied with a control program from said external device through said telephone line by means of said signal transmit-receive means.

\* \* \* \* \*